United States Patent
Farley et al.

(10) Patent No.: US 10,537,061 B2
(45) Date of Patent: Jan. 21, 2020

(54) SYSTEM AND METHOD FOR CONTROLLING HARVEST OPERATIONS

(75) Inventors: Herbert M. Farley, Elizabethtown, PA (US); Justin R. Ringwald, Ellinwood, KS (US); Ryan C. Benning, Austin, MN (US); Jay D. Schroeder, Coal Valley, IL (US)

(73) Assignee: CNH Industrial America LLC, New Holland, PA (US)

(*) Notice: Subject to any disclaimer, the term of this patent is extended or adjusted under 35 U.S.C. 154(b) by 1110 days.

(21) Appl. No.: 12/713,996

(22) Filed: Feb. 26, 2010

(65) Prior Publication Data

US 2011/0213531 A1 Sep. 1, 2011

(51) Int. Cl.
  *A01D 41/12* (2006.01)
  *G06F 19/00* (2018.01)
  *A01D 75/00* (2006.01)
  *A01D 41/127* (2006.01)
  *G06Q 10/06* (2012.01)
  *G06Q 50/02* (2012.01)

(52) U.S. Cl.
  CPC ......... *A01D 41/1275* (2013.01); *G06Q 10/06* (2013.01); *G06Q 50/02* (2013.01)

(58) Field of Classification Search
  CPC ..... A01D 41/1275; G06Q 10/06; G06Q 50/02
  USPC ................................................ 701/50; 460/1
  See application file for complete search history.

(56) References Cited

U.S. PATENT DOCUMENTS

| | | | |
|---|---|---|---|
| 3,979,731 A | 9/1976 | Naplatanov et al. | |
| 4,831,539 A | 5/1989 | Hagenbuch | |
| 5,529,537 A * | 6/1996 | Johnson | A01D 41/1275 460/119 |
| 5,742,914 A | 4/1998 | Hagenbuch | |
| 6,044,312 A | 3/2000 | Sudo et al. | |
| 6,097,425 A | 8/2000 | Behnke et al. | |
| 6,216,071 B1 | 4/2001 | Motz | |
| 6,351,697 B1 | 2/2002 | Baker | |
| 6,484,078 B1 | 11/2002 | Kageyama | |
| 6,587,772 B2 | 7/2003 | Behnke et al. | |
| 6,732,024 B2 | 5/2004 | Wilhelm Rekow et al. | |
| 6,741,921 B2 | 5/2004 | Cohen et al. | |
| 2002/0133309 A1 * | 9/2002 | Hardt | 702/129 |
| 2004/0210371 A1 | 10/2004 | Adachi et al. | |
| 2005/0197175 A1 | 9/2005 | Anderson | |
| 2006/0150584 A1 | 7/2006 | Weiss | |
| 2006/0240884 A1 | 10/2006 | Klimmer | |
| 2007/0129869 A1 | 6/2007 | Gudat et al. | |
| 2007/0135190 A1 * | 6/2007 | Diekhans et al. | 460/1 |
| 2010/0042297 A1 * | 2/2010 | Foster et al. | 701/50 |
| 2010/0285855 A1 * | 11/2010 | Chervenka | A01D 41/1275 460/119 |

* cited by examiner

*Primary Examiner* — Khoi H Tran
*Assistant Examiner* — Rodney P King
(74) *Attorney, Agent, or Firm* — Peter K. Zacharias; Patrick M. Sheldrake

(57) ABSTRACT

A system and method for monitoring and coordinating harvest operations is disclosed. The system and method includes a control system to real time monitor the grain capacity of one or more harvesters to optimize harvest operations. The control system may also monitor harvest and offload vehicle positions and provide instructions for optimizing harvest operations.

20 Claims, 2 Drawing Sheets

SYSTEM AND METHOD FOR CONTROLLING HARVEST OPERATIONS

FIELD OF THE INVENTION

The present invention relates generally to crop gathering devices. It relates more particularly to a monitoring sensor for a combine harvester storage bin.

BACKGROUND OF THE INVENTION

As farming operations become more complex, managing harvest operations, including machine logistics such as fill capacity, becomes more critical to operational efficiencies and profitability. In one attempt to improve operation, a harvester may include sensors to alert an operator when the grain bin fill level reaches full capacity. The term "harvester" is used herein to include combines or other agricultural vehicles for harvesting and temporarily storing a harvested crop.

In a typical operation, the harvested crop is discharged or offloaded into a grain cart, truck or other storage transport vehicle for transportation to a market or other destination when the grain bin reaches full capacity. The offload operation may include driving the harvester to a location of a transport vehicle parked on a road near the harvest field, or bringing a transport vehicle to a location adjacent the harvest field for offloading. In some instance, the harvester may need to cease harvesting while the harvester is still in the field because of reaching full grain bin capacity. In either case, harvesting is interrupted to offload the crop.

It is desirable to provide continuous harvesting and avoid nonproductive time in which a harvester is idle while awaiting to unload a harvested crop. To improve operations, additional harvest information would be useful to plan and/or coordinate harvesting operations. Additional harvest information may include the ability to accurately determine where in the field the grain bin will become full. Such information would allow an operator to determine if the harvester can harvest to the end of a row without overfilling the grain bin and/or allow the operator to notify a grain cart operator where to be positioned to minimize travel distances between the harvester and transport vehicle.

The present disclosure is directed to overcoming one or more of the problems as set forth above.

SUMMARY OF THE INVENTION

The present disclosure relates to a method for monitoring harvest capacity including providing a predetermined first harvester grain bin capacity of a first grain bin of a first harvester to a site database, determining a first real time fill level of the first harvester grain bin, determining a first real time fill rate of the first harvester grain bin, updating the site database with the first real time fill level and first real time fill rate, determining a first harvester expected time for the first harvester grain bin to reach the predetermined first harvester grain bin capacity, and updating the site database with the first harvester remaining time.

The present disclosure further relates to an apparatus for monitoring harvest capacity including a first harvester and a control system. The first harvester includes a first harvester capacity real time indicating system and a first harvester real time fill rate system. The control system includes a site database adapted for storing a dynamic model for harvest capacity and a microprocessor for receiving information from the first harvester capacity real time indicating, the first harvester real time fill rate system, and the site database. The microprocessor executes the dynamic model to responsively determine a first harvester remaining time for the first harvester to reach the predetermined first harvester grain bin capacity and updates the site database with the first harvest remaining time.

One advantage of the present disclosure is to provide an improved grain monitoring system and method for combines.

Another advantage of the present disclosure is to provide a monitoring system and method that provides an operator with harvest information that enables the operator to determine if a harvester can harvest to the end of a row without overfilling the grain bin.

Another advantage of the present disclosure is to provide a monitoring system and method that provides an operator with harvest information that enables the operator to notify a grain cart operator where to be positioned to minimize travel distances between the harvester and a grain truck.

Another advantage of the present disclosure is to provide a monitoring system and method that optimizes the operation of harvest equipment.

Another advantage of the present disclosure is to provide a harvesting operations control system that is simple to install, economical to manufacture, and easy to use.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present disclosure relates to a system and method for the real time monitoring of grain tank level information and harvester operations. Harvester operations may include machine logistics and harvesting decisions.

Figure 1:
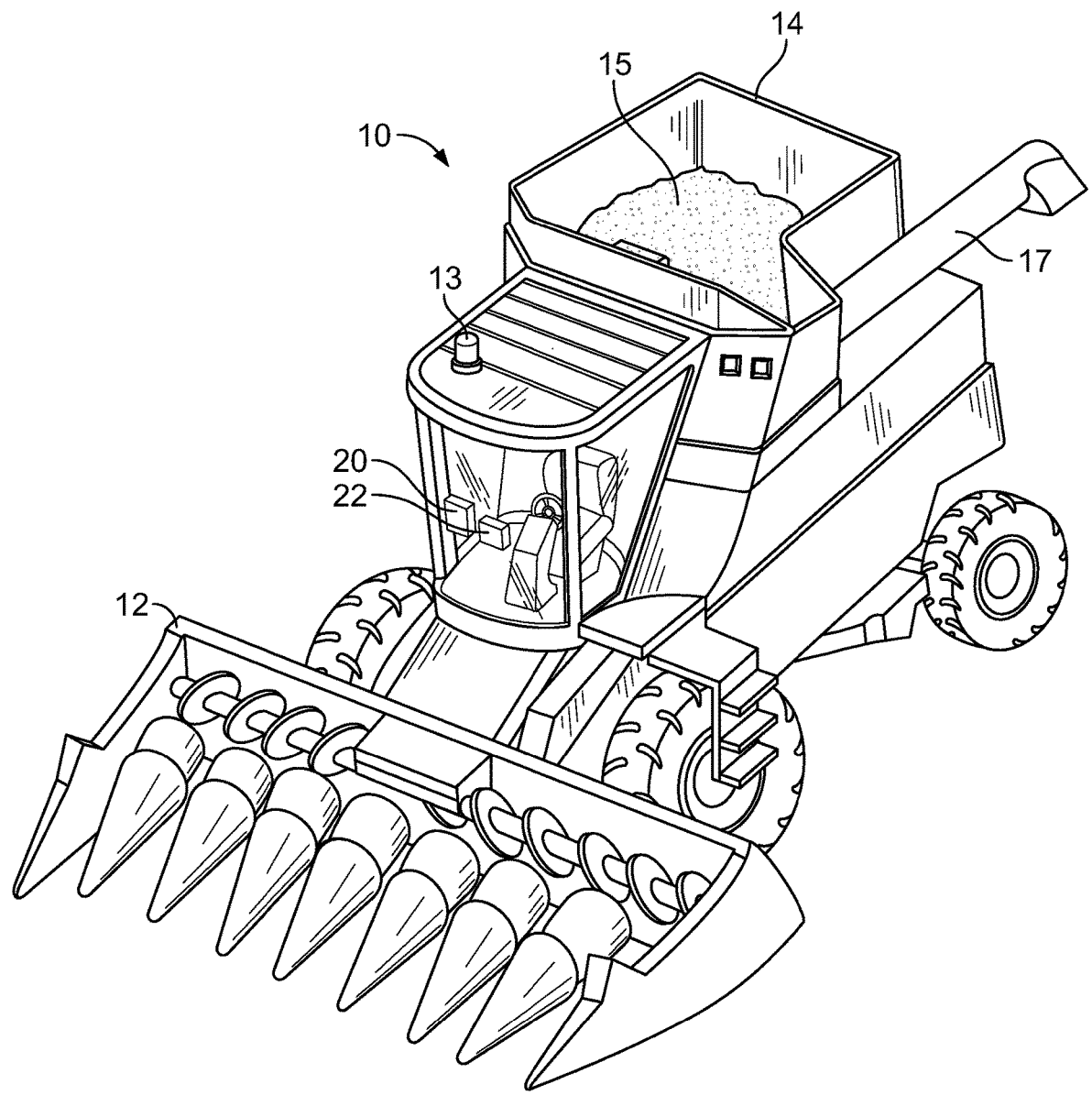
FIG. 1 is a top perspective view of an embodiment of a harvester with a control system according to the present disclosure.

FIG. 1 shows an embodiment of a harvester 10 adapted for harvesting an agricultural crop according to the present disclosure. The harvester 10 includes a work implement 12, a cab 13 and a grain bin (bin) 14 for temporarily storing the harvested crop 15. During operation, as the harvester 10 traverses a field, the crop is harvested by the work implement 12 and collected in the bin 14. At a predetermined harvest amount, the harvested crop 15 is transferred from the harvester 10 to a second agricultural machine or offload vehicle (not shown). In one embodiment, the predetermined harvest amount may be a predetermined harvested grain weight or a predetermined harvested grain volume as measured as a percent of the grain bin capacity. For example, the predetermined harvested grain volume may be, but is not limited to, about 50 volume percent (vol. %), 75 vol. %, or 100 vol. % (full capacity) of the bin 14. In one embodiment, the predetermined location may be an end of a specified crop row.

The offload vehicle may be, but is not limited to a grain cart, bin or other storage container. The offload vehicle may be self-propelled or pulled by a tractor or truck. In this embodiment, the harvested crop 15 is transferred by a transfer device 17 located on the harvester 10. The transfer device 17 may be an auger, conveyor, or other similar conveying device. In another embodiment, the harvested crop 15 may be transferred by a material transfer device such as, but not limited to a conveyor, auger, scoop, bucket or other conveyance device of a transference vehicle positioned in contact with the harvested crop 15. In yet another embodiment, the harvested crop 15 may be discharged from the harvester 10 and recovered by an offload vehicle.

The harvester 10 further includes a control system 20. The control system 20 includes a microprocessor and a database (not shown). The microprocessor receives and provides data of a particular harvest operation from and to the database. The microprocessor includes a computer program product embodied on a computer readable medium. The microprocessor is configured to execute the computer program product to generate harvest operations data. The harvest operations data may include, but is not limited to an offload value at which the harvested crop 15 is transferred from the harvester 10 to a second agricultural machine or offload vehicle (not shown). The offload value may be, but is not limited to, an amount of time to reach a predetermined harvest amount and/or the distance the harvester must harvest to reach a predetermined harvest amount. For example, the offload value may be the amount of time and/or the distance to harvest for the harvester 10 to obtain about 100 vol. % capacity. The harvest operations data is entered into the database and accessible and/or displayed to the operator.

The database is provided with harvest data for a particular harvest operation. The harvest data includes, but is not limited to, the maximum grain bin capacity, real time fill level and the current or stored grain level data of a particular harvest operation. In one embodiment, the harvest data may include, but is not limited to, a predetermined maximum grain bin capacity of one or more harvesters participating in the harvest operation, a harvest area map data, and one or more offload vehicle crop capacity data. The real time fill level is provided by the grain bin monitoring system.

The database may be embodied on a memory device, such as, but not limited to, a hard disk drive. The data base may be provided to the memory device from a storage device, such as, but not limited to a computer disk. In another embodiment, the data base may be manually input into the microprocessor.

The control system 20 further includes a display system 22 for displaying operational data to an operator (not shown). The display system 22 may include a data entry device, such as a touch screen. In another embodiment, the control system 20 may include a keyboard and/or other data entry device. The display system 22 may be a single display unit or may include multiple display units. In this exemplary embodiment, the control system 20 is located in the cab 13 of harvester 10. In another embodiment, the control system 20 may be located within and/or on the cab 13 and/or harvester 10, in or upon another harvester, agricultural machine or vehicle, or at the harvest or a remote location.

The control system 20 further includes a grain capacity monitoring system (not shown). In one embodiment, the grain capacity monitoring system includes a grain bin capacity monitoring system that determines the amount of grain in the bin 14. The grain bin monitoring system provides data of the harvest amount, or in other words, the amount of grain in the bin 14, to the control system 20. In one embodiment, the amount of grain may be determined by determining a vol. %, weight %, grain level or other relative quantity of grain bin capacity. In one embodiment, the grain capacity data is provided in real time. The grain capacity data may be provided continuously or semi-continuously to the data base.

In one embodiment, the grain bin capacity monitoring system may include, but is not limited to, any one or combination of contact and/or non-contact sensors. For example, the grain bin capacity monitoring system may include any one or combination of ultrasonic sensors, "smart" images, onboard weigh scales, and multiple contact sensors arranged from bottom to top of bin 14. "Smart" images are video or photo images processed through a computer or other computational device to determine the amount of grain in the bin 14. In one embodiment, the "smart" images are processed by the control system 20. The sensors provide continuous or semi-continuous data of the grain level in the bin 14.

The grain capacity monitoring system may further include a grain harvest flow system that provides real time data of the amount of grain harvested and provided to the bin 14, or in other words, a real time fill rate of the bin 14. The grain harvest flow system may include one or more grain flow sensors in the grain handling system. The grain flow sensors may be mass flow sensors and/or other similar mass and/or volume flow measurement devices.

In another embodiment, the grain capacity monitoring system determines the amount of grain in the bin 14 from the grain harvest flow system. In one embodiment, the grain capacity monitoring system continuously determines and/or calculates the harvest amount using one or more grain flow sensors monitoring the flow of grain into the bin 14. The grain flow sensors may be mass or volume flow sensors. In yet another embodiment, the grain capacity monitoring system determines the amount of grain in the bin 14 using one or more contact sensors in the bin 14 combined with one or more grain flow sensors in the grain handling system.

In another embodiment, a contact sensor is positioned in the bin 14, where under nearly all conditions, the level of grain in the bin 14 is below this sensor when the grain bin 14 is unloaded or in an otherwise empty or initial condition. This position may be referred to as a low position in the bin 14. When the harvester 10 is harvesting and the control system 20 receives an alert signal from this first sensor, the control system 20 is alerted that grain has reached a first predetermined amount of grain in the grain bin 14. This alert may be referred to as a first trigger point. In another embodiment, a plurality of contact sensors may be located at various positions within the grain bin 14 to account for variations in the initial level of grain in the grain bin 14 that may result from partially unloading the grain bin while harvesting and/or to provide correlation to the information from the mass flow sensor. The control system 20, using data from the mass flow sensor in combination with the one or more trigger points, continuously determines the grain level or amount and displays that data to the operator.

Figure 2:
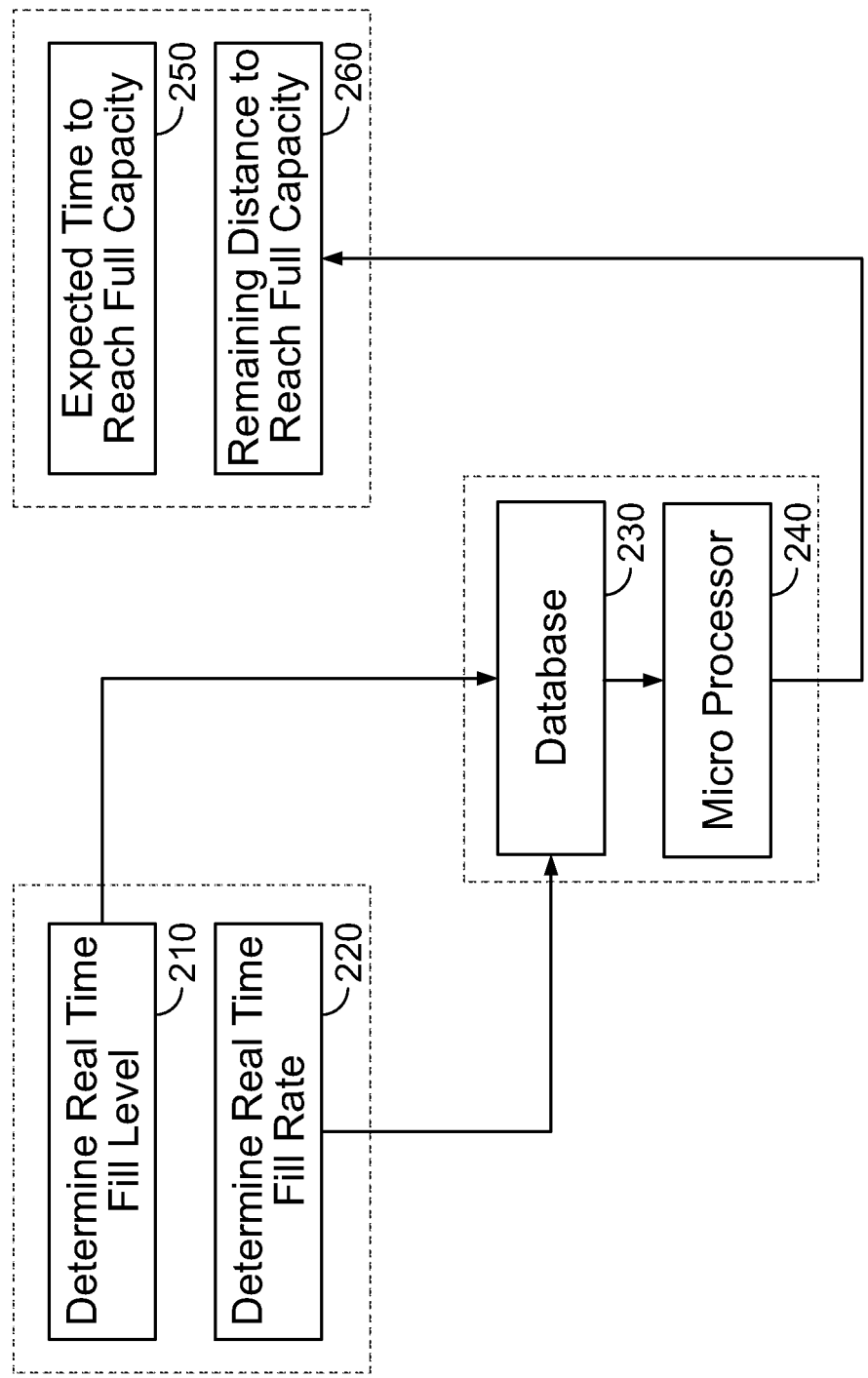
FIG. 2 is a block diagram illustrating an embodiment of a method of performing the present disclosure.

FIG. 2 illustrates an exemplary embodiment of a method of performing the present disclosure. As can be seen in FIG. 2, the method includes determining a real time harvest amount or fill level of grain in the bin 210 and providing that data to the database 230. The method further includes determining the real time fill rate of the grain bin 220 and providing that data to the database 230. The microprocessor 240 accesses the database and executes the embedded computer program to determine harvest operations data. The harvest operations data may include, but is not limited to an offload value at which the harvested crop is transferred from a harvester to a second agricultural machine or offload vehicle. The offload value may be, but is not limited to, an amount of time to reach a predetermined harvest amount and/or the distance the harvester must harvest to reach a predetermined harvest amount. In one embodiment, the offload value is the expected time to reach full capacity 250 and or the remaining distance to reach full capacity 260. In one embodiment, full capacity is about 100 vol. % capacity. The harvest operations data is entered into the database and accessible and/or displayed to the operator.

In another embodiment, the harvester 10 may be equipped with an onboard global positioning system (GPS). The GPS provides real time harvester position data to the control system 20. In an embodiment, the real time harvester position data base may be provided to the database. The database may be updated continuously or semi-continuously with the real time harvester position data. The control system 20 may also be configured to receive map data from the GPS. The map data may include, but is not limited to, an operational map (map) of the harvest area of interest. In one embodiment, the control system 20 receives map data and harvester position data from the GPS.

When the control system includes GPS data, the microprocessor may be configured to determine an offload value that includes one or more map locations or positions where the harvester is calculated to reach one or more predetermined grain bin amounts. These locations may be referred to as estimated offload locations. In one embodiment, the microprocessor may be configured to determine a harvest field position proximate to an edge of the harvest field or harvest crop row that is reached during harvesting operations before the harvester reaches a full grain bin. The estimated offload locations may be displayed on the display 22, on a GPS display, or by a combination of both displays to the harvester operator. The predetermined grain bin amounts may include an about full grain bin volume (about 100 vol. %) or some other fill level amount. The control system 20 may display the location and data to an operator on the display 22, on the GPS display, or by a combination of both displays.

In such a manner, the operator receives harvest operation data, including estimated offload locations, to assist the operator in making harvest operation decisions. In another embodiment, the harvest operation data may be transmitted to other vehicles and/or a central or remote control location, to provide harvest operation data to one or more operators, in addition to or in place of displaying the data to the harvester operator. The other vehicles may include one or more offload vehicles. The harvest operation data may be transmitted wirelessly by Bluetooth™ or other wireless transmission device. In one embodiment, the harvest operation data is used by an operator to plan harvest operations, including, but not limited to, offload vehicle and/or truck hauling activity. In one embodiment, the control system is configured to calculate and recommend harvest operations to an operator.

In yet another embodiment, the control system is configured to receive harvest operation data from one or more harvesters and/or one or more offload vehicles. In this embodiment, one or more of the harvesters and one or more of the offload vehicles may be equipped with individual control systems to report individual harvester and/or offload vehicle harvest data to the control system. In one embodiment, the control system 20 may determine and plot an optimal travel path for one or more offload or other catch vehicles to intersect with and/or service, including offloading, one or more harvesters in the same field. The harvest data may include, but is not limited to harvester and/or grain cart remaining grain bin capacity, real time grain bin fill rate, harvester and/or offload vehicle position, and/or other harvest data to one or more of the harvester, offload vehicle, or harvest operations operators.

The control system analyzes the harvest data in real time. In one embodiment, the control system analyzes the harvest data to determine an optimum harvest operation. The optimum harvest operation may include a harvest offload pattern. The harvest offload pattern may include, but is not limited to, which harvester to offload first and/or for how long to offload each harvester before moving to another harvester. The harvest offload pattern may maximize offload vehicle capacity, thereby optimizing offload locations for any number of harvesters working in a particular field. In one embodiment, the control system continuously updates the database as it monitors offload vehicle position from the last point of offload, remaining harvest capacity of one or more harvesters, and grain cart capacity. The control system performs optimization determinations to direct the placement and/or direction of travel of one or more of the offload vehicles. In another embodiment, field boundaries and harvested crop maps may be provided to the control system database to further calculate harvest operation data including a shortest distance and/or route around standing crop (the crop to be harvested) to an estimated offload location.

In yet another embodiment, one or more harvesters and/or one or more offload vehicles are equipped with GPS auto guidance that provides route planning. The GPS auto guidance provides route planning data to the control system. In one embodiment, the GPS auto guidance provides route planning to the control system to direct an offload vehicle along a predetermined optimized intercept path to a harvester to be offloaded.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for monitoring and coordinating harvest operations comprising:
   determining real time fill levels of one or more grain bins of one or more corresponding harvesters using a computer in communication with one or more grain flow sensors, wherein the computer includes a microprocessor and a computer program product embodied on a computer readable medium executable to determine a harvest operation offload value for optimizing offloading operations of the one or more grain bins during harvesting operations within a field;
   determining real time fill rates of the one or more grain bins of the one or more corresponding harvesters using the computer;
   updating a site database with the determined real time fill levels and real time fill rates; and
   determining the offload value for the one or more harvesters using the computer in communication with the site database based upon at least one of the real time fill levels and real time fill rates of at least one other vehicle in the updated site database.

2. The method of claim 1, wherein the offload value for the one or more harvesters comprises an amount of time for the one or more harvesters to reach a predetermined harvester grain bin capacity.

3. The method of claim 1, wherein the offload value for the one or more harvesters comprises a distance for the one or more harvesters to harvest to reach a predetermined harvester grain bin capacity.

4. The method of claim 1, further comprising:
updating the site database with an operational map; and
providing real time position data for the one or more harvesters to the site database;
wherein the offload value for the one or more harvesters comprising an offload location position where the one or more harvesters reach a predetermined harvest grain bin capacity.

5. The method of claim 4, wherein the real time position data is generated by a global positioning system.

6. The method of claim 1, wherein the computer is further configured to:
provide real time position data for one or more offload vehicles.

7. The method of claim 6, further comprising:
plotting an optimal travel path for one or more offload vehicles to intersect with one or more harvesters for an offload operation.

8. The method of claim 1, wherein the computer is further configured to provide real time position data for one or more offload vehicles, and further comprising the steps of:
storing predetermined data in the site database, wherein the predetermined data includes at least one of a grain bin capacity of the one or more harvesters, a capacity of one or more offload vehicles, and an amount of grain to be harvested;
determining second and third offload values for the one or more harvesters using the computer in communication with the site database, wherein the offload value comprises an amount of time for the one or more harvesters to reach a predetermined grain bin capacity, wherein the second offload value comprises the distance for one or more harvesters to harvest to reach the predetermined harvester grain bin capacity, and wherein the third offload value comprises an offload location position where one or more harvesters reach the predetermined harvest grain bin capacity, wherein the offload value is further based upon the predetermined data, wherein the second and third offload values are each based upon the predetermined data;
plotting an optimal travel path for one or more offload vehicles to intersect with one or more harvesters for an offloading operation; and
displaying operational data on a display system of the one or more harvesters or the one or more offload vehicles.

9. A harvest system, comprising:
one or more harvesters comprising one or more corresponding control systems, the one or more control systems comprising:
a grain capacity monitoring system to determine one or more corresponding real time harvest amounts, the grain capacity monitoring system including a plurality of contact sensors for determining fill levels of grain; and
one or more offload vehicles;
wherein the control system is configured to
determine real time fill levels of one or more grain bins of one or more corresponding harvesters,
determine real time fill rates of the one or more grain bins of the one or more corresponding harvesters;
determine real time fill rates of the one or more offload vehicles;
update a site database with the real time fill levels and the real time fill rates of the one or more grain bins of the one or more corresponding harvesters and the one or more offload vehicles,
determine an offload value for the one or more harvesters to reach a predetermined harvester grain bin capacity based upon at least one of the determined real time fill levels and fill rates of at least one other vehicle in the updated site database, and
receive an alert based on a real time fill level of grain reaching one of the plurality of contact sensors.

10. The system of claim 9, wherein the control system is further configured to determine the offload value further comprising an amount of time for the one or more harvesters to reach the predetermined harvester grain bin capacity, or a distance for one or more harvesters to harvest to reach the predetermined harvester grain bin capacity.

11. The system of claim 10, wherein the one or more offload vehicles comprises at least one individual control system for providing real time position data for the one or more offload vehicles to the control system.

12. The system of claim 11, wherein the control system is further configured to plot an optimal travel path for one or more offload vehicles to intersect with one or more harvesters for an offload operation.

13. The system of claim 9, wherein the control system is further configured to update a site database with an operational map, and provide real time position data for one or more harvesters to the site database; and wherein the offload value comprises an offload location position where one or more harvesters reach the predetermined harvest grain bin capacity.

14. The system of claim 9, wherein the plurality of contact sensors are positioned within various locations of the grain bin to determine variations in an initial level of grain within the grain bin.

15. The system of claim 9, wherein the control system is configured to determine variations in an initial level of grain within the grain bin via the plurality of control sensors.

16. A control system for harvest operations, comprising:
a grain capacity monitoring system to determine real time harvest amounts comprising real time fill levels and real time fill rates of corresponding harvester grain storage bins from one or more harvesters and one or more offload vehicles,
a database configured to receive the real time harvest amounts from the one or more harvesters and the one or more offload vehicles; and
a microprocessor;
wherein the microprocessor comprises a computer program product embodied on a computer readable medium, the microprocessor configured to access the database and to execute the computer program product to generate harvest operations data based on the real time harvest amounts;
wherein the harvest operations data comprises a harvest offload pattern for the corresponding harvester grain storage bins including which harvester to offload first, a period of time for offloading a harvester before proceeding to another harvester based on one of a position of the one or more offload vehicles, a remaining harvester grain storage bin capacity, and a remaining offload vehicle capacity, and an offload value comprising an amount of time for the harvester grain storage bins to reach one or more corresponding predetermined harvester grain storage bin capacities and a distance for the one or more harvesters to harvest to reach the one or more corresponding predetermined harvester grain storage bin capacities.

17. The control system of claim 16, further comprising:
one or more global positioning systems for determining the corresponding locations of the harvesters and providing the locations of the harvesters to the database.

18. The control system of claim 17, wherein the harvest operations data includes an offload location position where the harvesters reach a predetermined harvest grain storage bin capacity.

19. The control system of claim 17, further comprising:
one or more additional global positioning systems for determining the corresponding locations of one or more offload vehicles and providing the locations of the one or more offload vehicles to the database.

20. The control system of claim 19, wherein the generated harvest operations data further comprises an optimal travel path for the one or more offload vehicle to intersect with the harvesters for offload operations.

\* \* \* \* \*